Patented May 20, 1952

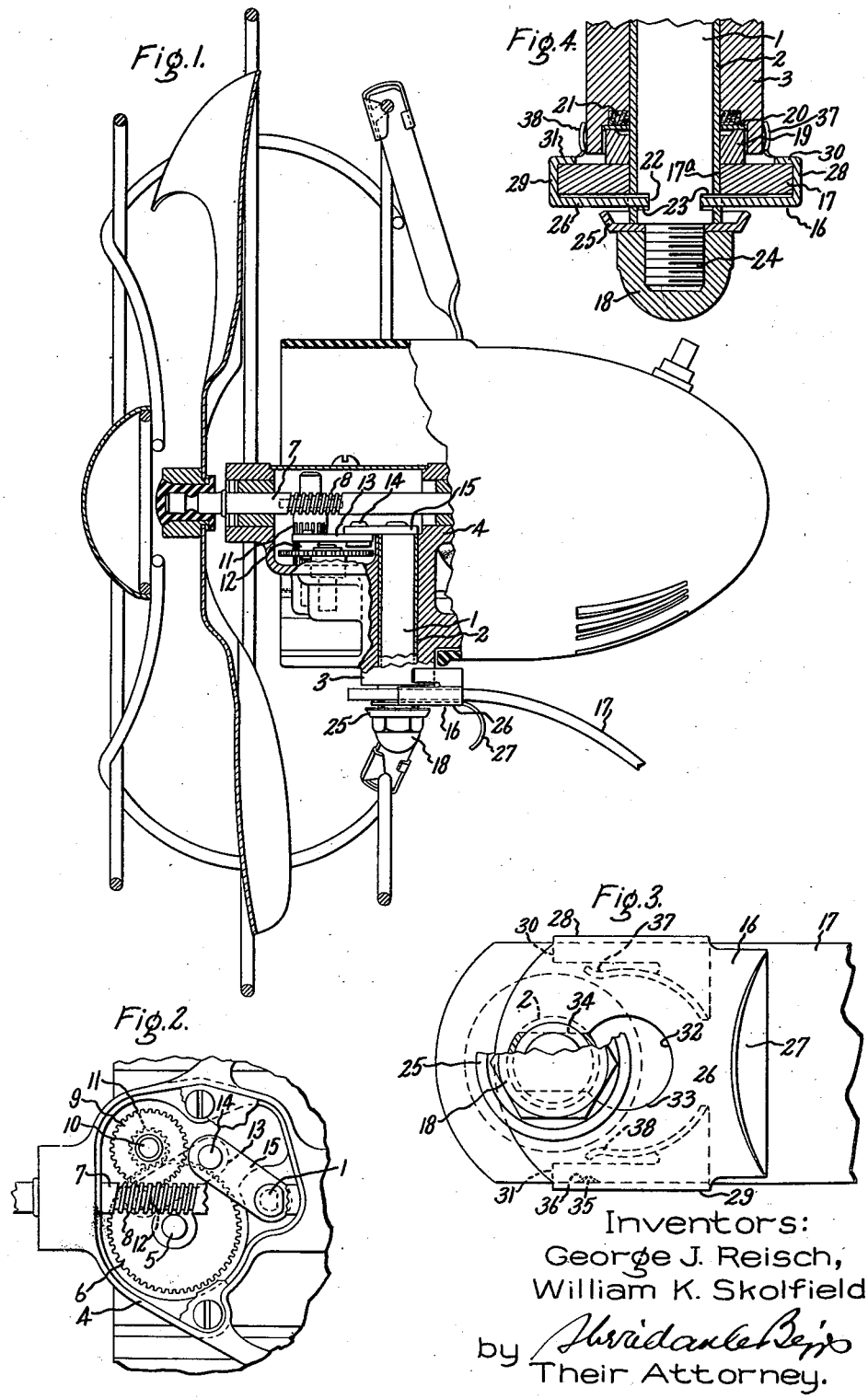

2,597,034

UNITED STATES PATENT OFFICE 2,597,034

CLUTCH FOR OSCILLATING FANS

George J. Reisch, Devon, and William K. Skolfield, Bridgeport, Conn., assignors to General Electric Company, a corporation of New York Application October 26, 1950, Serial No. 192,272

3 Claims. (Cl. 230—256)

1

This invention relates to household fans of the oscillating type and, in particular, to a new and improved clutch therefor.

By clutch is meant a device that engages or disengages a fan from a mechanism capable of cyclically oscillating the fan periodically through a prefixed angle.

While oscillating fans are well known in the art and while they have a distinct purpose in circulating the air within a room, it is desirable, under some circumstances, to stop the cyclic oscillation of a fan and to position it in such a manner that it will force an air stream in but one direction.

It is an object of this invention, then, to provide a new and improved clutch for an oscillating fan.

It is a further object of this invention to provide a new and improved clutch that is simple in installation and in operation.

It is a still further object of this invention to provide a new and improved clutch that is readily adaptable to existing oscillating fans of a particular type.

It is a still further object of this invention to provide a new and improved clutch for an oscillating fan that is durable and simple in operation.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Briefly, this invention comprises the combination of a swivel stud, sleeve bearing, and a fan housing, all in concentric axial alignment and supported on a fixed stand. The fan housing and the swivel stud are so interconnected by a clutch that the oscillation of the fan housing is dependent upon a fixed position of the swivel stud. The clutch locks or frees the swivel stud and thus controls the oscillation of the fan.

For a more complete understanding of the application of this clutch to an oscillating fan, reference is made to a copending application, Serial No. 59,847, filed November 13, 1948 and assigned to the same assignee as the present application.

Referring to the drawing, Fig. 1 is a side view, partly in section, of an oscillating fan such as that described in the subject copending application provided with the new and improved clutch;

2

Fig. 2 is a cut-away plan view showing the oscillating mechanism; Fig. 3 is a bottom view of the clutch and the support stand for the fan; and Fig. 4 is a front view, partly in section, showing the clutch and oscillating fan mounted on the support stand.

In the drawing, a swivel stud or shaft 1 is shown mounted within swivel bearing 2, which, in turn, is within a protrusion 3 on fan housing 4. Each of these elements is concentrically positioned in bearing fit to provide for movement one relative to the other.

The oscillating mechanism of the fan is shown in Fig. 2, wherein a stud 5 is fixedly secured within the fan housing 4. A gear 6 is mounted on shaft 5 to rotate in response to the rotation of a driven shaft 7 powered by a fan motor (not shown). A worm 8 is cut on shaft 7 and is in engagement with a gear 9 that is secured to and rotatable on a shaft 10. A gear 11 is fixedly secured to and rotatable with gear 9. Gear 11, in turn, drives gear 6.

A pin 12 is positioned on gear 6 at a convenient distance from the center thereof. A drag link 13 is mounted on pin 12 and secured by a hinge pin 14 to a link 15 fixedly supported by swivel stud 1.

The rotation of gear 6, because of the linkage described, causes hinge pin 14 to oscillate through an arc as pin 12 revolves about shaft 5. If swivel stud 1 is fixed, however, then hinge pin 14 is also fixed; consequently, shaft 5 must oscillate through an arc if pin 12 is to rotate with gear 6 about shaft 5. Since shaft 5 is fixed in the fan housing 4, the housing oscillates when swivel stud 1 is fixed.

The present invention is directed to a device that will control the movement of swivel stud 1. That is, to a clutch 16 which, when engaged, locks swivel stud 1, thus causing fan housing 4 to oscillate as above described; or, when disengaged, permits the oscillation of swivel stud 1 thereby to stop the oscillation of the fan housing.

Before going into the details of the clutch, however, it is necessary to understand the supporting structure for the fan housing 4, the swivel stud 1, and the protrusion 3. Specifically, the swivel stud 1 and the fan housing 4 are supported on a stand 17 having an aperture 17a in which is secured swivel bearing 2, around which gear case 4 oscillates and through which the swivel stud 1 is passed to be secured to the swivel bearing 2 by means of an acorn nut 18. A thrust bearing 19, a bearing plate 20, and a grease seal 21 position housing 4 for rotation relative to the stand 17.

To facilitate the assembly of this structure, swivel stud 1 is provided with slots 22 which correspond to slots 23 provided in the swivel bearing. Each of the slots is formed by removing a portion of each of two opposite sides of the swivel stud and the swivel bearing to provide two exposed flat sides on the swivel stud. Swivel stud 1 and bearing 2 each have a portion that extends below their respective slots and, in addition, swivel stud 1 has a threaded portion 24 engageable with acorn nut 18. A cup fitting 25 is assembled on stud 1 between the stud and acorn nut 18 to retain stud 1 in engagement with swivel bearing 2.

Clutch 16 comprises a bottom portion 26 having an extended hook-like portion 27 and a pair of side portions 28 and 29. The side portions 28 and 29 are spaced apart to slidably engage stand 17 and they are each further provided with an inwardly directed bend 30 and 31, respectively, substantially parallel to the bottom portion 26. The combination of the inward bend 30, side 28 and bottom 26 and the combination of inward bend 31, side 29 and bottom 26 form channels to guide the movement of clutch 16 along the support stand 17.

A keyhole slot 32 is cut or otherwise formed in the bottom portion 26 of latch 16. This keyhole slot 32 comprises a circular opening 33 and an elongated opening 34. The circular opening 33 is of a diameter sufficient to allow the swivel stud 1 to pass freely therethrough, while the slotted portion 34 is so contructed as to be of the width sufficient to engage the slotted sides of swivel stud 1. Specifically, when the elongated opening 34 is placed in slidable engagement with the flat portions of swivel stud 1, the stud is prevented from rotating relative to swivel bearing 2 and the stand 17.

To facilitate the movement of clutch 16 from the slotted position of engagement to the circular position, the hook portion 27 is provided for a gripping means to manually move this latch back and forth to either of the desired positions.

To facilitate the positioning of clutch 16 relative to stand 17 and swivel stud 1, a male indent portion 35 is provided in either side 28 or 29 of the clutch 16, and a corresponding female indent portion 36 is provided in the stand 17. With this structure, when male indent 35 engages female indent 36, the position of the latch relative to the stand is fixed to the degree that the fan vibrations will not move the latch along the stand.

While no particular configuration is intended as the limitation for the shape of fan housing protrusion 3, it has been found in a preferred embodiment that if a number of sides are chamfered where fan housing protrusion 3 is adjacent support 17, that a pair of fingers 37 and 38, one on each side of the clutch 16, can engage the chamfered side on the fan housing protrusion 3 to position the fan housing relative to stand 17. The fingers 37, 38, however, are so constructed that they do not engage the chamfered edges of fan housing 3 when the slotted portion 34 of the keyhole opening 32 is in engagement with the flat surfaces of swivel stud 1, but that they do engage the fan housing when the circular portion 33 of keyhole opening 32 surrounds the swivel stud 1.

With this structure, it is possible to position the fan housing in any of several predetermined positions when swivel stud 1 is surrounded by the circular opening 33 and fingers 37, 38 engage the chamfered sides of the fan housing.

Clutch 16 is slidable to permit the engagement of either elongated opening 34 or circular opening 33 with the swivel stud 1. When the elongated opening 34 is in engagement with swivel stud 1, the swivel stud is fixed relative to the stand; consequently, the fan housing through the linkage arrangement above described is forced to oscillate through a prefixed angle. On the other hand, if clutch 16 is moved to permit circular opening 33 to surround swivel stud 1, then the swivel stud is not fixed and can rotate itself, whereupon the fan housing remains in any fixed position, due to the gripping action of fingers 37, 38.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What we claim as new and desire to secure by Letters Patent of the United States is:

1. In an oscillating fan having a supporting stand, a fan housing, a driving motor within said housing, a driving shaft driven by said motor, and an oscillating mechanism responsive to the operation of said shaft to oscillate said fan housing through a predetermined angle including a swivel stud rotatably supporting said fan housing on said stand and rotatable both with respect to said housing and said stand, and a driving connection between said swivel stud and shaft to effect oscillation of said stud with respect to said stand, thereby to effect oscillation of said fan housing on said stand when said stud is locked from oscillation and to free said housing from oscillation when said stud is freed to oscillate, and means for locking and releasing said swivel stud to produce and stop the oscillation of said fan comprising a clutch in slidable engagement with said supporting stand, said clutch defining a keyhole slot formed by a circular opening and a juxtapositioned elongated opening, either of which is engageable with said swivel stud, said swivel stud having a pair of oppositely disposed flat surfaces formed thereon to be engageable with said elongated opening, said swivel stud being free to oscillate when said circular opening of said keyhole slot engages said shaft, said swivel stud being locked to said stand when said elongated opening engages said flat surface on said swivel stud to prevent rotation thereof and to produce an oscillatory movement of said fan.

2. In an oscillating fan having a supporting stand, a driving motor, a driving shaft, and an oscillating mechanism responsive to the operation of said fan motor to cyclically turn said fan through a predetermined angle, including a gear driven by said driving shaft, a pin located on said gear at a fixed distance from the center thereof, a swivel stud for supporting said fan on said supporting stand, and a linkage system joining said pin with said swivel stud, said gear and said linkage system producing oscillations of said fan only when said swivel stud is locked to said supporting stand, means for locking and releasing said swivel stud to produce and stop the oscillation of said fan comprising a clutch in slidable engagement with said supporting stand, said clutch defining a keyhole slot formed by a circular opening and a juxtapositioned elongated opening, either of which is engageable with said swivel stud, said swivel stud having a pair of oppositely disposed flat surfaces formed thereon to be engageable with said elongated opening, said swivel stud being free to oscillate when said circular opening of said keyhole slot engages said shaft, said swivel stud being locked to said stand when said elongated opening engages said flat surface on said swivel stud to prevent rotation thereof and to produce an oscillatory movement of said fan.

3. In an oscillating fan having a supporting stand, a housing, a driving motor, a driving shaft, and an oscillating mechanism responsive to the operation of said fan motor to cyclically turn said fan through a predetermined angle, including a gear driven by said driving shaft, a pin located on said gear at a fixed distance from the center thereof, a swivel stud for supporting said fan on said supporting stand, and a linkage system joining said pin with said swivel stud, said gear and said linkage producing oscillations of said fan only when said swivel stud is locked to said supporting stand, clutch means for locking and releasing said swivel stud to produce and stop the oscillation of said fan comprising a plate having a pair of channels one on either side of said plate, said channels being engageable with said supporting stand to slidably position said clutch plate to either of two positions, said clutch plate defining a keyhole slot formed by a circular opening and a juxtapositioned elongated opening one of which is engageable with said swivel stud in either of the positions of said clutch plate, said swivel stud having a pair of oppositely disposed flat surfaces formed thereon to be engageable with said elongated opening, said swivel stud being free to oscillate when said circular opening of said keyhole engages said swivel stud, said swivel stud being locked to said stand when said elongated opening of said clutch plate engages said flat surfaces of said swivel stud to prevent rotation thereof and to produce oscillating movement of said fan, a pair of resilient fingers positioned one on each of said channels to engage said fan housing when said circular openings of said clutch plate engages said swivel stud to position said fan in a predetermined direction.

GEORGE J. REISCH.
WM. K. SKOLFIELD.

No references cited.